(12) United States Patent
Lan et al.

(10) Patent No.: US 8,576,345 B2
(45) Date of Patent: Nov. 5, 2013

(54) CHOLOESTERIC LIQUID CRYSTAL DISPLAY AND FABRICATION THEREOF

(75) Inventors: Kai-Wei Lan, New Taipei (TW); Chao-Wen Chen, Miaoli County (TW); Wan-Wen Chiu, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 132 days.

(21) Appl. No.: 13/191,432

(22) Filed: Jul. 26, 2011

(65) Prior Publication Data
US 2012/0162555 A1 Jun. 28, 2012

(30) Foreign Application Priority Data
Dec. 24, 2010 (TW) ................................ 99145762 A

(51) Int. Cl.
*G02F 1/133* (2006.01)
*G02F 1/1335* (2006.01)
*C09K 19/02* (2006.01)

(52) U.S. Cl.
USPC .................. 349/36; 349/20; 349/33; 349/115; 349/176; 349/185

(58) Field of Classification Search
USPC .......... 349/33, 35, 36, 20, 115, 175, 185, 176
See application file for complete search history.

(56) References Cited

U.S. PATENT DOCUMENTS

| 4,031,529 | A | * | 6/1977 | Borel et al. .................. 345/101 |
| 4,832,461 | A | | 5/1989 | Yamagishi et al. |
| 5,223,937 | A | | 6/1993 | Moriguchi et al. |
| 5,437,811 | A | * | 8/1995 | Doane et al. .............. 252/299.01 |
| 6,266,113 | B1 | | 7/2001 | Yamazaki et al. |
| 6,359,673 | B1 | * | 3/2002 | Stephenson .................... 349/185 |
| 6,885,409 | B2 | * | 4/2005 | Stephenson et al. .............. 349/2 |
| 7,195,802 | B2 | | 3/2007 | Iftime et al. |
| 8,471,998 | B2 | * | 6/2013 | Ishii et al. ..................... 349/182 |
| 2005/0041202 | A1 | | 2/2005 | Jubin et al. |

FOREIGN PATENT DOCUMENTS

| CN | 1993725 | 7/2007 |
| TW | 201001385 | 1/2010 |
| TW | 201024883 | 7/2010 |

OTHER PUBLICATIONS

Po-Wen Liu et al., "Large Area Black/White Bistable Cholesteic Liquid Crystal Display and the Thermal-Addressing System," Journal of the Society for Information Display, Dec. 2010, pp. 1084-1089, vol. 18, Issue 12, SID, US.
Chao-Wen Chen et al., "Performance Enhancement of Cholesteric Liquid Crystals Display," Industrial Technology Research Institute, pp. 378 -381, Apr. 2010, Taiwan.
Chien-Hui Wen, "Dielectric Heating Effects of Dual-Frequency Liquid Crystals," Applied Physics Letters, 2005, 3 pages, American Institute of Physics, US.
C.H. Chiang et al., "The Coating and Drying Process Window for Ch-LC Films," Industrial Technology Research Institute, pp. 394-397, Apr. 2010, Taiwan.
Taiwan Patent Office, Office Action, Patent Application Serial No. 099145762, Apr. 29, 2013, Taiwan.

* cited by examiner

*Primary Examiner* — Edward Glick
*Assistant Examiner* — Mark Teets

(57) ABSTRACT

A cholesteric liquid crystal display is provided, including a substrate, a first electrode layer disposed on the substrate, and a liquid crystal layer disposed on the first electrode layer, wherein the liquid crystal layer comprises at least two liquid crystals having different sensitivities to driving frequencies, mixed with each other, and liquid crystals having a greater initial state-transition temperature are more sensitive to driving frequency.

9 Claims, 2 Drawing Sheets

CHOLOESTERIC LIQUID CRYSTAL DISPLAY AND FABRICATION THEREOF

BACKGROUND

This application claims priority of Taiwan Patent Application No. 099145762, filed on Dec. 24, 2010, the entirety of which is incorporated by reference herein.

TECHNICAL FIELD

The disclosure relates generally to a choloesteric liquid crystal display, and more particularly to a choloesteric liquid crystal display and fabrication thereof.

DESCRIPTION OF THE RELATED ART

For the current energy-saving trend, light, thin and electricity saving displays are main stream in the display field. For example, bistable liquid crystal displays, such as choloesteric liquid crystal displays have many features, such as high brightness, high contrast, saving energy, memorable characteristic, wide viewing angles and no flicker. Specifically, the bright state (planar texture/state) and dark state (focal conic texture/state) of a choloesteric liquid crystal display are maintained when an electric field is removed. Therefore, choloesteric liquid crystal displays are an important developing technology.

Choloesteric liquid crystals can reflect a specific wavelength at a planar texture/state. When the reflected wavelength is in an visible-light region, human eyes can receive the reflected light. The currently developed choloesteric liquid crystal displays are single colored and a new choloesteric liquid crystal display which can present multi-colors and can reflect light with multiple-reflecting wavelengths is required.

U.S. Pat. No. 4,031,529 uses a heat driving method and electric fields with various frequencies for liquid crystals to have different dielectric constants, such that liquid crystals having different optical states are obtained. However, the technique does not disclose applying an electric field with different frequencies and under different driving temperatures to control state change of two or more liquid crystals for presenting multi-colors. U.S. Pat. No. 5,223,937 discloses an ink jet recording apparatus which can provide high quality pictures using a static method when receiving various image signal frequencies. In the patent, the driving voltage and temperature are different according to different signal frequencies. However, this technique does not disclose applying an electric field with different frequencies and under different driving temperatures to control state/texture change of two or more liquid crystals for presenting multi-colors or multiple light wavelengths.

SUMMARY

The disclosure provides a choloesteric liquid crystal display, comprising a substrate, a first electrode layer disposed on the substrate, and a liquid crystal layer disposed on the first electrode layer, wherein the liquid crystal layer comprises at least two liquid crystals having different sensitivities to driving frequencies, mixed with each other, and liquid crystals having a greater initial state-transition temperature is more sensitive to driving frequency.

The disclosure further provides a method for displaying a choloesteric liquid crystal display. A choloesteric liquid crystal display, comprises a substrate, a first electrode layer disposed on the substrate, and a liquid crystal layer disposed on the first electrode layer, wherein the liquid crystal layer comprises at least two liquid crystals having different sensitivities to driving frequencies mixed with each other, and liquid crystals having a greater state-transition temperature are more sensitive to driving frequency. Heat and electricity comprising voltage or driving frequency are applied to drive the liquid crystals for brightening or darkening thereof, wherein the applied voltage or driving frequency are changed with regard to different liquid crystals for liquid crystals to have different changing amounts of state-transition temperatures,

BRIEF DESCRIPTION OF DRAWINGS

The disclosure can be more fully understood by reading the subsequent detailed description and examples with references made to the accompanying drawings, wherein.

DETAILED DESCRIPTION

It is understood that specific embodiments are provided as examples to teach the broader inventive concept, and one of ordinary skill in the art can easily apply the teaching of the present disclosure to other methods or apparatuses. The following discussion is only used to illustrate the invention, not limit the invention.

Figure 1:
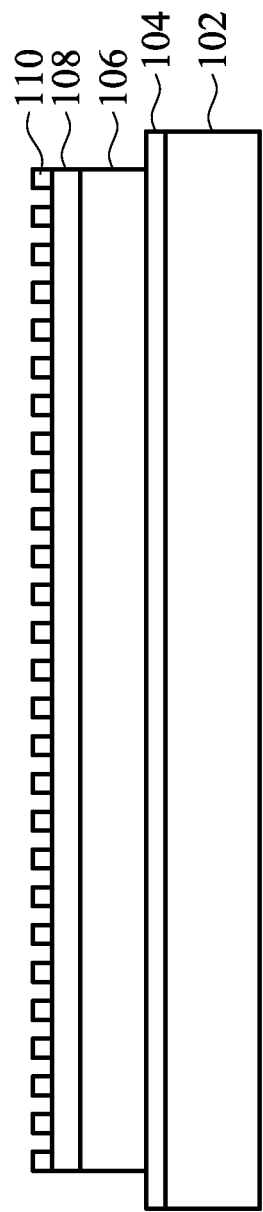
FIG. 1 is a cross section of a choloesteric liquid crystal display of an embodiment of the disclosure.

FIG. 1 is a cross section of a choloesteric liquid crystal display of an embodiment of the disclosure. Referring to FIG. 1, a substrate 102 is provided. In an embodiment, the substrate 102 is a transparent substrate, such as glass or polyethylene terephthalate (PET). Next, a first electrode layer 104 is formed on the substrate 102. In an embodiment, the first electrode layer 104 is a transparent conductive layer, such as indium tin oxide (ITO) or indium zinc oxide (IZO). Next, a liquid crystal layer 106 is formed on the first electrode layer 104. In an embodiment, the liquid crystal layer 106 comprises at least two liquid crystals having different sensitivities to driving frequencies, mixed with each other, wherein liquid crystals having a greater initial state-transition temperature are more sensitive to driving frequency. In other words, the liquid crystals having a greater initial state-transition temperature are more sensitive to driving frequency than the liquid crystals having a lower initial state-transition temperature. A light absorbing layer 108 is formed on the liquid crystal layer 106. In an embodiment, the light absorbing layer 108 is black. Alternatively, the light absorbing range of the light absorbing layer 108 can be dependant upon production design concern to absorb visible light, ultraviolet light or infrared light. A second electrode layer 110 is disposed on the light absorbing layer 108, wherein the second electrode layer 110 can be a transparent electrode or an opaque electrode, wherein the second electrode layer 110 can be disposed over or under the light absorbing layer 108. In an embodiment, the second electrode layer 110 is formed of metal having high reflectivity, such as silver. The disclosure does not limit the light absorbing layer 108 to be over the liquid crystal layer 106. The light absorbing layer 108 can be disposed between the liquid crystal layer 106 and substrate 102.

Figure 2:
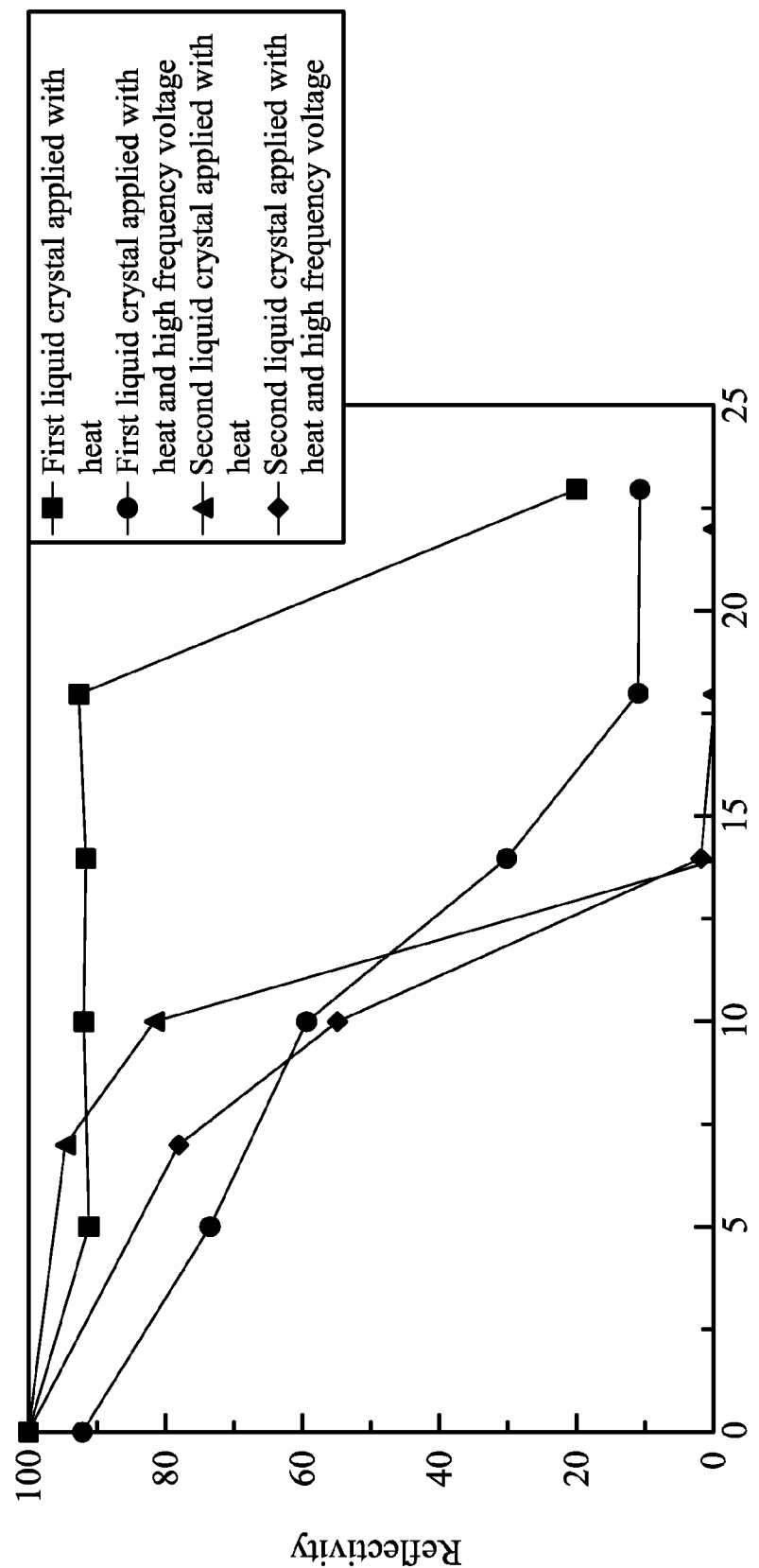
FIG. 2 is the characteristics of liquid crystals in the liquid crystal layer with reflectivity as a function of temperature.

The characteristics of liquid crystals in the liquid crystal layer are illustrated in accordance with FIG. 2, wherein FIG. 2 shows a diagram with reflectivity as a function of temperature. The diagram includes a temperature-reflectivity curve of a first liquid crystal, a temperature-reflectivity curve of the first liquid crystal applied with high frequency voltage, a temperature-reflectivity curve of a second liquid crystal, and a temperature-reflectivity curve of the second liquid crystal applied with high frequency voltage. Moreover, the first liquid crystal reflects a light with a first wavelength and second liquid crystal reflects a light with a second wavelength. As shown in FIG. 2, the first liquid crystal requires greater state-transition temperature than the second liquid crystal, and the first liquid crystal is more sensitive to high frequency voltage than the second liquid crystal. Therefore, as shown in FIG. 2, the first liquid crystal applied with a high frequency voltage, such as the condition of 10V and 10 KHz, requires lower state-transition temperature than the second liquid crystal applied with the high frequency voltage. The disclosure simultaneously applies high frequency voltages to the first liquid crystal and second liquid crystal having different state-transition temperatures to control reflectivity of a specific wavelength of the first and second liquid crystals in the liquid crystal layer according to sensitivity differences of the first and second liquid crystals to driving frequency for the choloesteric liquid crystal display to present reflection of light with different wavelengths. It is noted that result of driving the liquid crystal should change when applied voltage or driving frequency varies.

EXAMPLE

The first liquid crystal having a blue color is more sensitive to driving frequency than the second liquid crystal having a red color. The description of the liquid crystal being sensitive to driving frequency is identical to the amount of change of the state-transition temperature of the liquid crystal when applied with a high frequency. The liquid crystal is more sensitive to driving frequency means that the state-transition temperature of the liquid crystal has a greater change when applied with a driving frequency.

The blue liquid crystal has a state-transition temperature of 75° C., and the red liquid crystal has a state-transition temperature of 65° C. When both the blue liquid crystal and red liquid crystal are applied with a high frequency voltage, such as the condition of 10 KHz and 10V, the state-transition temperature of the blue liquid crystal is reduced to 55° C. and state-transition temperature of the red liquid crystal is reduced to 60° C.

The disclosure provides a displaying method of a multi-color choloesteric liquid crystal display according to the characteristics of the liquid crystals described above.

First table

| Optical state | Driving condition | Blue | Red |
| --- | --- | --- | --- |
| All color brightening | 100 V | ◯ | ◯ |
| All color darkening | 80° C. | X | X |
| Red color darkening | 70° C. | ◯ | X |
| Blue color darkening | 10 V, 10 KHz, 55° C. | X | ◯ |

◯: Bright state; X: Dark state

Referring to the first table, the example can apply a voltage of 100V to switch a blue liquid crystal and red liquid crystal to a bright state. Therefore, the blue and red liquid crystals are presented as planar textures and the cholesteric liquid crystal display presents a color mixture of blue and red. Alternatively, the example can apply a temperature of 80° C. (the temperature higher than the state-transition temperature of the blue and red liquid crystals) to switch the blue and red liquid crystals to a dark state. The blue and red liquid crystals are presented as focal conic textures and the cholesteric liquid crystal display presents the color of the light absorbing layer (for example a dark color). The example can apply a temperature of 70° C. (the temperature higher than the state-transition temperature of the blue liquid crystal but lower than the state-transition temperature of the red liquid crystal) to darken the red liquid crystal. The cholesteric liquid crystal display presents the color of the blue liquid crystal. The example can apply a temperature of 55° C. and a high frequency voltage (for example the condition of 10 KHz and 10V). Since the state-transition temperature of the blue liquid crystal is reduced to be lower than the state-transition temperature of the red liquid crystal after applying the high frequency voltage, the temperature 55° C. can darken the blue liquid crystal but the red liquid crystal remains at a bright state. The cholesteric liquid crystal display presents the color of the red liquid crystal.

According to the description above, the example can control two reflecting wavelengths of light in a liquid crystal layer by adjusting the application of temperature and voltage frequency. Although the disclosure above only discloses a cholesteric liquid crystal display with two kinds of liquid crystals and displaying methods thereof. The disclosure is not limited thereto. The disclosure can further add a third liquid crystal having a greater initial state-transition temperature than the first liquid crystal and more sensitive to driving frequency than the first liquid crystals. Accordingly a high voltage is simultaneously applied to the first, second and third liquid crystals having different state-transition temperatures to control reflectivity of a specific wavelength of the first, second and third liquid crystals in the liquid crystal layer according to sensitivity differences of the first, second and third liquid crystals to driving frequency for the cholesteric liquid crystal display to present reflection of light with different wavelengths.

While the disclosure has been described by way of example and in terms of the preferred embodiments, it is to be understood that the disclosure is not limited to the disclosed embodiments. It is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for operating a cholesteric liquid crystal display, comprising:
providing a cholesteric liquid crystal display, comprising a substrate, a first electrode layer disposed on the substrate, and a liquid crystal layer disposed on the first electrode layer, wherein the liquid crystal layer comprises at least two liquid crystals having different sensitivities to driving frequencies mixed with each other, and the liquid crystals having a greater state-transition temperature are more sensitive to driving frequency; and
applying heat and electricity comprising voltage or driving frequency to drive the liquid crystals for brightening or darkening thereof, wherein the applied voltage or driving frequency are changed with regard to different liquid crystals for liquid crystals to have different changing amounts of state-transition temperatures, such that the liquid crystal layer can present light with at least two wavelengths.

2. The method for operating a cholesteric liquid crystal display as claimed in claim 1, wherein the liquid crystal layer comprises a first liquid crystal and a second liquid crystal, and the first liquid crystal requires a greater state-transition temperature than the second liquid crystal, and the first liquid crystal is more sensitive to driving frequency than the second liquid crystal.

3. The method for operating a cholesteric liquid crystal display as claimed in claim 2, wherein the step of applying heat and electricity to drive the liquid crystals for brightening or darkening thereof comprises:

applying a driving condition to brighten the entire first liquid crystal and second liquid crystal.

4. The method for operating a cholesteric liquid crystal display as claimed in claim 2, wherein the step of applying heat and electricity to drive the liquid crystals for brightening or darkening thereof comprises:

applying a driving condition to darken the entire first liquid crystal and second liquid crystal.

5. The method for operating a cholesteric liquid crystal display as claimed in claim 2, wherein the step of applying heat and electricity to drive the liquid crystals for brightening or darkening thereof comprises:

applying a temperature which is between the state-transition temperature of the first liquid crystals and second liquid crystals to darken the second liquid crystal.

6. The method for operating a cholesteric liquid crystal display as claimed in claim 2, further comprising applying the driving frequency to change the state-transition temperature of the first liquid crystal and second liquid crystal, wherein the state-transition temperature of the first liquid crystal is changed to be lower than the state-transition temperature of the second liquid crystal.

7. The method for operating a cholesteric liquid crystal display as claimed in claim 6, wherein the step of applying heat and electricity to drive the liquid crystals for brightening or darkening thereof comprises:

applying a temperature which is between the state-transition temperature of the first liquid crystal and second liquid crystal with the driving frequency to darken the first liquid crystal.

8. The method for operating a cholesteric liquid crystal display as claimed in claim 6, wherein the result of driving the liquid crystals changes when the applied voltage varies.

9. The method for operating a cholesteric liquid crystal display as claimed in claim 6, wherein the result of driving the liquid crystals changes when a pulse time of the driving frequency varies.

* * * * *